United States Patent
Schilling et al.

(10) Patent No.: US 10,085,303 B2
(45) Date of Patent: Sep. 25, 2018

(54) METHOD AND INDUCTION HEATING DEVICE FOR DETERMINING A TEMPERATURE OF A COOKING VESSEL BASE

(75) Inventors: Wilfried Schilling, Kraichtal (DE);
Tobias Schönherr, Kraichtal (DE);
Werner Kappes, Neckargerach (DE);
Martin Volk, Baden-Baden (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 1537 days.

(21) Appl. No.: 12/952,399

(22) Filed: Nov. 23, 2010

(65) Prior Publication Data

US 2011/0120989 A1    May 26, 2011

(30) Foreign Application Priority Data

Nov. 26, 2009    (DE) .................. 10 2009 047 185

(51) Int. Cl.
| H05B 6/06 | (2006.01) |
| G01K 11/22 | (2006.01) |
| G01K 11/26 | (2006.01) |

(52) U.S. Cl.
CPC ............. *H05B 6/062* (2013.01); *G01K 11/26* (2013.01); *H05B 2213/07* (2013.01)

(58) Field of Classification Search
CPC .... H05B 2213/07; H05B 6/062; C07H 11/04; C07H 13/04; C07H 15/04; C07H 5/02

(Continued)

(56) References Cited

U.S. PATENT DOCUMENTS 3,898,410 A * 8/1975 Peters, Jr. ............... H02M 5/45
                                                           219/622
3,932,801 A * 1/1976 Peters, Jr. ..................... 363/124
(Continued)

FOREIGN PATENT DOCUMENTS

| CN | 101112123 A | 1/2008 |
| DE | 102 53 198 A1 | 6/2004 |

(Continued)

OTHER PUBLICATIONS

European Patent Office, Extended Search Report for European Patent Application No. 10191835.7, dated Feb. 6, 2012, 7 pages, European Patent Office, Germany.

(Continued)

*Primary Examiner* — Tu B Hoang
*Assistant Examiner* — Diallo I Duniver
(74) *Attorney, Agent, or Firm* — Alston & Bird LLP

(57) ABSTRACT

An induction heating device comprises a frequency converter that generates a high-frequency drive voltage from an intermediate circuit voltage generated at least temporarily as a function of an AC mains voltage, a resonant circuit having an induction heating coil, with the drive voltage applied to the resonant circuit, and a temperature detection device that determines a temperature of a cooking vessel base which is heated by means of the induction heating coil. An auxiliary voltage source generated the intermediate circuit voltage over predefined time periods at a constant level. The frequency converter generates the drive voltage over time periods such that the resonant circuit oscillates at a natural resonant frequency in a substantially de-attenuated manner, and the temperature detection device further measuring at least one oscillation parameter over the time periods, and to evaluate the at least one measured oscillation parameter in order to determine the temperature.

15 Claims, 2 Drawing Sheets

(58) Field of Classification Search
USPC .......... 219/600–677, 678–763; 374/E11.009, 374/117; 373/138–166
See application file for complete search history.

(56) References Cited

U.S. PATENT DOCUMENTS

| | | | | |
|---|---|---|---|---|
| 4,638,135 A * | 1/1987 | Aoki | ...................... | H05B 6/062 |
| | | | | 219/497 |
| 5,488,214 A * | 1/1996 | Fettig | .................... | H05B 6/062 |
| | | | | 219/127 |
| 5,648,008 A * | 7/1997 | Barritt et al. | ................. | 219/626 |
| 5,750,963 A * | 5/1998 | Christensen | .......... | F24C 15/106 |
| | | | | 219/441 |
| 6,904,378 B2 * | 6/2005 | Schilling | ............ | G05D 23/1917 |
| | | | | 219/460.1 |
| 2006/0076338 A1 | 4/2006 | Kagan | | |
| 2007/0084857 A1 * | 4/2007 | Osaka | .......................... | 219/660 |

FOREIGN PATENT DOCUMENTS

| | | | | |
|---|---|---|---|---|
| DE | 10 2004 033 115 A1 | 2/2006 | | |
| DE | 10 2007 036 334 A1 | 2/2009 | | |
| EP | 0619692 A2 | 10/1994 | | |
| EP | 1420613 A2 * | 5/2004 | ............. | H05B 6/062 |
| WO | WO 97/16943 | 5/1997 | | |

OTHER PUBLICATIONS

German Office Action from German Application No. 10 2009 047 185.5 dated Sep. 13, 2010.

* cited by examiner

METHOD AND INDUCTION HEATING DEVICE FOR DETERMINING A TEMPERATURE OF A COOKING VESSEL BASE

CROSS REFERENCE TO RELATED APPLICATIONS

This application claims priority to German Application Number 10 2009 047 185.5, filed on Nov. 26, 2009, the contents of which are incorporated by reference for all that it teaches.

FIELD OF THE INVENTION

The invention relates to a method and an induction heating device for determining a temperature of a cooking vessel base which is heated by means of an induction heating coil.

BACKGROUND OF THE INVENTION

In induction heating devices, an alternating magnetic field is generated by means of an induction heating coil and this alternating magnetic field induces eddy currents and causes remagnetization losses in a cooking vessel which is to be heated and has a base composed of ferromagnetic material, as a result of which the cooking vessel is heated.

The induction heating coil is a constituent part of a resonant circuit which comprises the induction heating coil and one or more capacitors. The induction heating coil is usually designed as a flat, helically-wound coil with associated ferrite cores and arranged, for example, beneath a glass-ceramic surface of an induction hob. In this case, the induction heating coil forms, in conjunction with the cookware to be heated, an inductive and a resistive part of the resonant circuit.

In order to drive or excite the resonant circuit, a low-frequency AC mains voltage with a mains frequency of, for example, 50 Hz or 60 Hz is first rectified and then converted into an excitation or drive signal with a high frequency by means of semiconductor switches. The excitation signal or the drive voltage is usually a rectangular voltage with a frequency in a range of from 20 kHz to 50 kHz. A circuit for generating the excitation signal is also called a (frequency) converter.

SUMMARY

Various methods are known for setting a heating power output of the induction heating device.

In a first method, a frequency of the excitation signal or of the rectangular voltage is varied as a function of the heating power to be output or of the desired power conversion. This method for setting the heating power output makes use of the fact that a maximum heating power is output when the resonant circuit is excited at its resonant frequency. The greater the difference between the frequency of the excitation signal and the resonant frequency of the resonant circuit, the lower is the heating power which is output.

However, if the induction heating device has a plurality of resonant circuits, for example if the induction heating device forms an induction hob with different induction cooking points, and different heating powers are set for the resonant circuits, so-called "beats" are produced which can lead to interfering noise by superimposition of the different frequencies of the excitation signals.

One method for setting the heating power which avoids interference noise resulting from such beats is pulse-width modulation of the excitation signal at a constant exciter frequency at which an effective value of a heating power is set by means of varying the pulse width of the excitation signal. However, high switch-on and switch-off currents are produced in the semiconductor switches in the case of effective value control of this kind by varying the pulse width at a constant exciter frequency, as a result of which a broadband and high-energy interference spectrum is produced.

It is often desirable to determine a temperature of a cooking vessel base which is inductively heated in this way, in order to be able to generate, for example, specific heating time profiles.

WO 1997/016943 discloses a method in which temperature-dependent changes in ferromagnetic properties of the cooking vessel base are measured and are evaluated in order to determine the temperature of the cooking vessel base.

The invention is based on the object of providing a method and an induction heating device for determining a temperature of a cooking vessel base which is heated by means of an induction heating coil, which method and induction heating device enable the temperature to be determined reliably and without interference.

The invention achieves this object by virtue of a method and an induction heating device as claimed herein.

The method serves to determine a temperature of a cooking vessel base which is heated by means of an induction heating coil. It comprises the steps of: generating an intermediate circuit voltage at least temporarily as a function of a single-phase or polyphase, in particular three-phase, AC mains voltage, generating a high-frequency drive voltage (or drive current) from the intermediate circuit voltage, for example at a frequency in a range of from 20 kHz to 50 kHz, and applying the drive voltage to a resonant circuit comprising the induction heating coil. The cooking vessel base is conventionally inductively heated in this way. The following steps are carried out for measuring the temperature: generating the intermediate circuit voltage over predefined time periods, in particular periodically, at a constant voltage level, with the intermediate circuit voltage preferably being generated independently of the AC mains voltage over the time periods, generating the drive voltage over the predefined time periods in such a way that the resonant circuit oscillates at its natural resonant frequency in a substantially de-attenuated manner, measuring at least one oscillation parameter of the oscillation over the predefined time periods, and evaluating the at least one measured oscillation parameter in order to determine the temperature. Since the intermediate circuit voltage is kept constant during the temperature measurement operation, signal influences on account of a variable intermediate circuit voltage can be eliminated, as a result of which the temperature can be determined reliably and without interference.

In one development, the method comprises the steps of: determining zero crossings of the AC mains voltage and selecting the time periods in the region of the zero crossings. In the case of a single-phase AC mains voltage, the intermediate circuit voltage usually drops severely in the region of the zero crossings. The constant voltage level is preferably selected in such a way that it is greater than the voltage level usually set in the region of the zero crossings, so that the intermediate circuit voltage is clamped at the constant voltage level in the region of the zero crossings. Constant voltage conditions, which enable reliable temperature measurement, then prevail in the region of the zero crossings.

In one development, the time periods are substantially centred with respect to the zero crossings, that is to say a partial time period of the time periods before the zero crossing has approximately the same duration as a partial time period of the time periods following the zero crossing.

In one development, the time periods have a duration in a range of from 50 µs to 1000 µs, in particular 400 µs to 600 µs.

In one development, the at least one oscillation parameter comprises the natural resonant frequency, an amplitude of a resonant circuit voltage, for example a voltage across the induction heating coil, an amplitude of a resonant circuit current and/or a phase shift between the resonant circuit voltage and the resonant circuit current.

In one development, the intermediate circuit voltage is generated over the time periods at a level in a range of from 10 V to 50 V, in particular of from 15 V to 25 V.

In one development, a frequency of the drive voltage and/or a pulse duty factor of the drive voltage are/is varied for the purpose of setting a heating power, which is to be output by the induction heating coil, at times outside the time periods.

In one development, the method comprises the following further steps of: measuring a current profile through the induction heating coil and/or a voltage profile across the induction heating coil, and generating the drive voltage synchronously to the measured current profile or to the measured voltage profile in such a way that the resonant circuit oscillates at its natural resonant frequency in a substantially de-attenuated manner in the time periods.

In one development, the method comprises the following further steps of: generating the drive voltage by means of a half-bridge circuit comprising two IGB transistors, with the IGB transistors being driven by a control signal, generating a power setting signal as a function of a heating power which is to be output, generating a de-attenuation signal as a function of the measured current profile or the measured voltage profile, and selecting the power setting signal as the control signal at times outside the time periods, and selecting the de-attenuation signal as the control signal at times within the time periods.

In one development, the control signal is generated at the edges of the time periods by logically combining the power setting signal and the de-attenuation signal. This synchronises the power setting signal and the de-attenuation signal, as a result of which switching peaks are avoided at the time period edges.

The induction heating device according to the invention is designed to carry out the abovementioned method. The induction heating device comprises a frequency converter which is designed to generate a high-frequency drive voltage from an intermediate circuit voltage which is generated at least temporarily as a function of an AC mains voltage, a resonant circuit having an induction heating coil, with the drive voltage being applied to the resonant circuit, and a temperature detection device which is designed to determine a temperature of a cooking vessel base which is heated by means of the induction heating coil. An auxiliary voltage source is also provided, this being designed to generate the intermediate circuit voltage over predefined time periods at a constant level. The frequency converter is designed to generate the drive voltage over the time periods in such a way that the resonant circuit oscillates at its natural resonant frequency in a substantially de-attenuated manner. The temperature detection device is designed to measure at least one oscillation parameter of the oscillation over the time periods, and to evaluate the at least one measured oscillation parameter in order to determine the temperature.

In one development, a zero crossing detector, which is designed to determine zero crossings of the AC mains voltage, and a control device, which is designed to select the time periods in the region of the zero crossings, are provided.

In one development, the auxiliary voltage source is designed to generate an auxiliary voltage at a level in a range of from 10 V to 50 V, in particular of from 15 V to 25 V.

In one development, the induction heating device also comprises measurement means which are designed to measure a current profile through the induction heating coil and/or a voltage profile across the induction heating coil, with the frequency converter being designed to generate the drive voltage synchronously to the measured current profile or the measured voltage profile in such a way that the resonant circuit oscillates at its natural resonant frequency in a substantially de-attenuated manner over the time periods.

In one development, the induction heating device also comprises a half-bridge circuit comprising two IGB transistors which are driven by a control signal, with the frequency converter being designed to generate a power setting signal as a function of a heating power which is to be output, and a de-attenuation signal as a function of the measured current profile or the measured voltage profile. A selection means of the induction heating device or the frequency converter is designed to select the power setting signal as the control signal at times outside the time periods, and to select the de-attenuation signal as the control signal at times over the time periods.

In one development, a gate driver circuit for the IGB transistors is provided, with the auxiliary voltage source being designed to supply a supply voltage to the gate driver circuit. As an alternative, a dedicated supply voltage device for supplying a supply voltage to the gate driver circuit can be provided, with this supply voltage device additionally forming the auxiliary voltage source.

BRIEF DESCRIPTION OF THE DRAWINGS

The invention will be described below with reference to the drawings which represent preferred embodiments of the invention. In the drawings.

DETAILED DESCRIPTION

Figure 1:
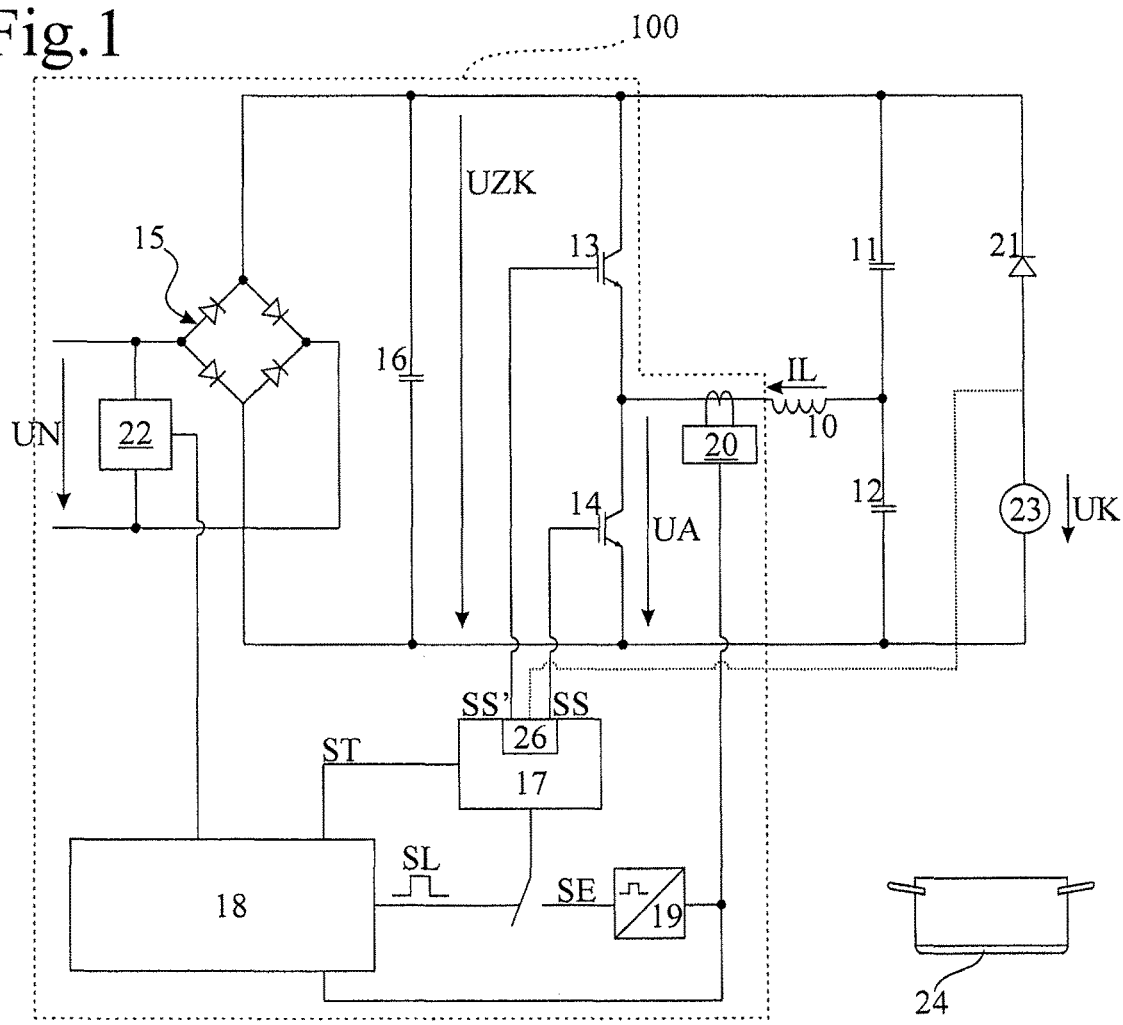
FIG. 1 schematically shows a block diagram of a first embodiment of an induction heating device according to the invention, FIG. 2 schematically shows a time profile of an intermediate circuit voltage of the induction heating device shown in FIG. 1, FIG. 3 schematically shows an oscillogram of various signals of the induction heating device shown in FIG. 1, and FIG. 4 schematically shows a block diagram of a further embodiment of an induction heating device according to the invention.

FIG. 1 shows a block diagram of a first embodiment of an induction heating device according to the invention.

The induction heating device comprises a frequency converter 100 which is designed to generate a high-frequency drive voltage UA from an intermediate circuit voltage UZK, which is generated as a function of an AC mains voltage UN, and as a function of an auxiliary voltage UK, which is generated by means of an auxiliary voltage source 23, for the purpose of driving a resonant circuit.

To this end, the frequency converter 100 comprises a conventional full-bridge rectifier 15 for rectifying the AC mains voltage UN. An intermediate circuit capacitor 16 to which the intermediate circuit voltage UZK is applied is provided for pre-filtering a frequency converter current. The auxiliary voltage source 23 is coupled to the output of the full-bridge rectifier 15 via a decoupling diode 21.

Figure 2:
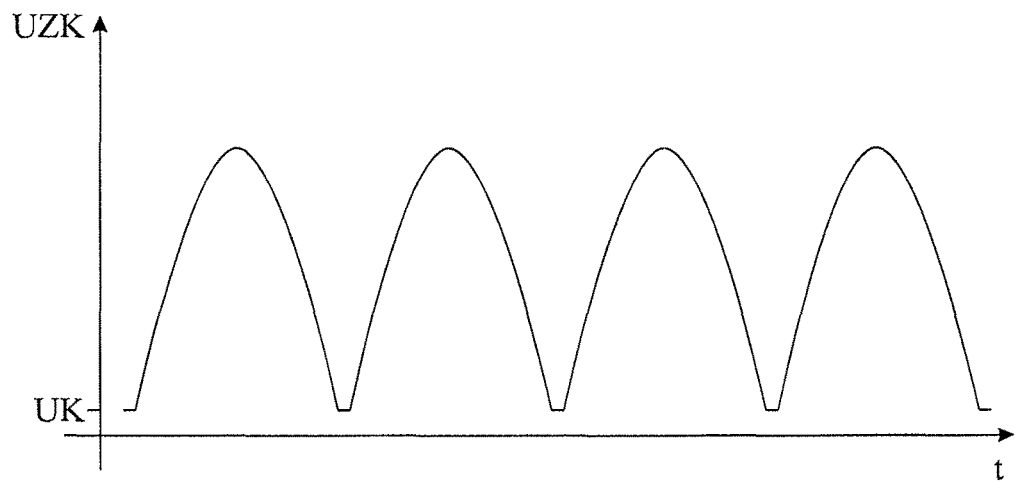

When the intermediate circuit capacitor 16 is discharged as the mains voltage UN falls, given a corresponding power output by the induction heating device, the intermediate circuit voltage UZK falls in line with the mains voltage UN until it is lower than the voltage UK minus a threshold voltage of the diode 21. Further discharge of the intermediate circuit capacitor 16 is then prevented by the auxiliary voltage source 23 in conjunction with the diode 21, that is to say the intermediate circuit voltage UZK is clamped at the auxiliary voltage UK at the lower end. This relationship is illustrated in FIG. 2 in the form of the profile of the intermediate circuit voltage UZK with respect to time t. The auxiliary voltage UK is typically approximately 20 V.

The frequency converter 100 also comprises a half-bridge circuit having two IGB transistors 13 and 14 which are looped-in in series between outputs of the full-bridge rectifier 15 and are driven by a control signal SS or SS'. The control signals SS and SS' have complementary levels.

The high-frequency drive voltage UA generated by means of the IGB transistors 13 and 14 serves to drive the resonant circuit which comprises an induction heating coil 10 and two capacitors 11 and 12. The capacitors 11 and 12 are looped-in in series between outputs of the full-bridge rectifier 15. A connection node of the capacitors 11 and 12 is electrically connected to a connection of the induction heating coil 10. The other connection of the induction heating coil 10 is electrically connected to a connection node of the two IGB transistors 13 and 14.

A gate driver circuit 26 of the IGB transistors 13 and 14 is optionally fed by means of the auxiliary voltage source 23 or a supply voltage is supplied to the said gate driver circuit. The gate driver circuit 26 generates the control signals SS and SS' for the gate connections of the IGB transistors 13 and 14 at a suitable voltage level.

The frequency converter also comprises a zero crossing detector 22 which is designed for determining zero crossings, a magnitude and/or a phase angle of the AC mains voltage UN, a digital signal processor 18 which is coupled to the zero crossing detector 22 and which generates a power setting signal SL in the form of a rectangular voltage with a variable pulse duty factor as a function of a heating power which is to be output, a measurement means in the form of a current sensor 20 which measures a current profile through the induction heating coil 10, a pulse generator 19 which is coupled to the current sensor 20 and generates a de-attenuation signal SE from a current signal generated by means of the current sensor 20, and a selection means 17 which is designed to generate the control signals SS and SS' from the power setting signal SL and/or to generate the control signal SS and SS' from the de-attenuation signal SE as a function of a selection signal ST which is generated by the signal processor 18. If the control signals SS and SS' have identical levels, generation ends with a selection of the signals SL and SE, otherwise one of the signals SS or SS' is generated by simple selection and the other of the signals SS or SS' is generated by forming the complement to the selected signal SL or SE.

The signal processor 18 and the current sensor 20 form, or are part of, a temperature detection device which is designed to determine a temperature of a cooking vessel base 24 which is heated by means of the induction heating coil 10.

Figure 3:
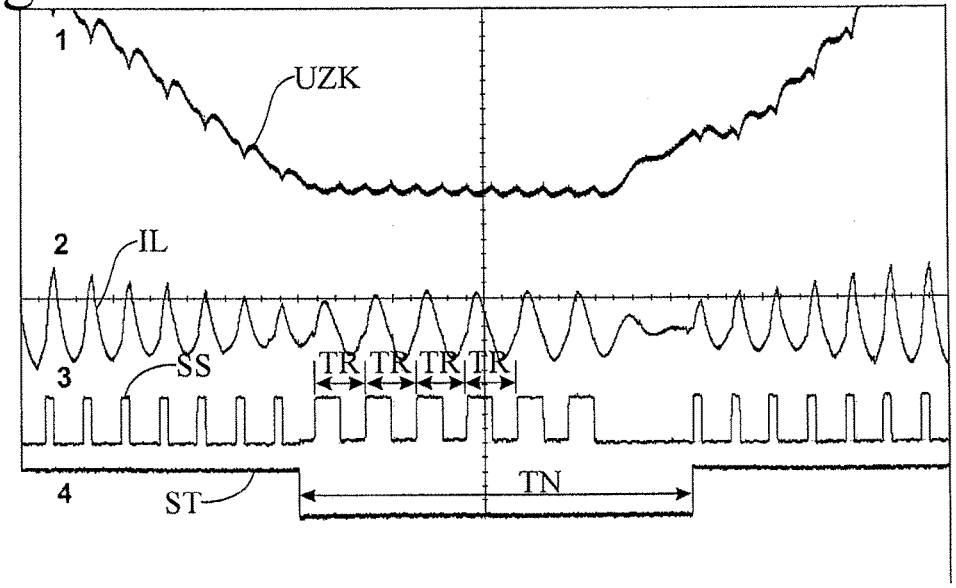

The corresponding operating and evaluation method is described in detail below with reference to FIG. 3, with FIG. 3 showing an oscillogram of various signals of the induction heating device shown in FIG. 1.

FIG. 3 illustrates time profiles of the intermediate circuit voltage UZK, of a resonant circuit current and of a current IL through the induction heating coil 10 and of the selection signal ST, by way of example for a time period TN of several identical time periods. The illustrated profiles are repeated periodically with the AC mains voltage UN.

The frequency converter 100 generates the rectangular power setting signal SL conventionally as a function of a heating power which is to be output by, for example, varying a frequency and/or a pulse duty factor of the power setting signal SL as a function of the heating power.

If the selection signal ST is at a high level, the selection means 17 generates the control signals SS and SS' in such a way that the control signal SS is identical to the power setting signal SL and the control signal SS' is identical to the complementary power setting signal SL.

If the selection signal ST is at a low level, the selection means 17 generates the control signals SS and SS' in such a way that the control signal SS is identical to the de-attenuation signal SE and the control signal SS' is identical to the complementary de-attenuation signal SE.

The selection signal ST is generated by the signal processor 18 as a function of a signal which is supplied by the zero crossing detector 22 and indicates, for example, a magnitude and/or a phase angle of the AC mains voltage UN. The selection signal ST is generated at a low level in a time period TN which is centred with respect to the zero crossing of the AC mains voltage UN and has a duration of approximately 500 μs. The selection signal ST is generated at a high level outside the time period TN.

The temperature of the cooking vessel base 24 which is heated by means of the induction heating coil 10 is determined at a substantially constant intermediate circuit voltage UZK over the time period TN, as a result of which corruption of the measured values on account of a variation in the intermediate circuit voltage is avoided.

For temperature measurement purposes, the drive voltage UA is generated over the time period TN in such a way that the resonant circuit oscillates at its natural resonant frequency 1/TR in a substantially de-attenuated manner. The signal processor 18 measures the time durations TR between successive pulses of the signal which is supplied by the current sensor 20 and evaluates the measured time durations TR for the purpose of determining the temperature.

The measurement principle makes use of the fact that ferromagnetic properties of the pot base 24 are temperature-dependent. Therefore, an effective inductance of the induction heating coil 10 is likewise temperature-dependent, that is to say a resonant frequency of the resonant circuit varies as a function of the pot base temperature, on account of magnetic coupling effects with the pot base. By way of example, an empirically determined characteristic curve can be stored in the signal processor 18, the said characteristic curve associating a pot base temperature with a resonant frequency, that is to say a mathematical relationship between the pot base temperature and the measured value can be analysed and stored in the signal processor 18 in the form of a function equation. Specific function equations can be stored for different pot base materials and can be automatically activated, for example by RFID technology, or activated by a user before a measurement process.

Further parameters can be taken into consideration in order to determine the temperature exactly. Therefore, by way of example, the electrical and magnetic properties of the induction heating coil 13 themselves are temperature-dependent to a certain extent. The cause is, for example, the temperature dependence of the permeability of a used ferrite on a lower face of the induction heating coil and of a resistor of a coil wire. Therefore, a cooking point temperature can additionally be taken into account in order to accurately detect the pot base temperature. To this end, an additional temperature sensor can be provided on the induction heating coil 10.

In order for the resonant circuit to oscillate in a substantially de-attenuated manner in the time period TN, the de-attenuation signal SE is generated as a function of the measured current profile, as a result of which the control signals SS and SS' which are derived from the de-attenuation signal SE in time period TN are generated in the correct phase with respect to resonant oscillation. The drive voltage UA is therefore generated in synchronism with the measured current profile in such a way that the resonant circuit oscillates at its natural resonant frequency in a substantially de-attenuated manner. This increases the measurement accuracy.

After changing over to resonance operation in time period TN, it is possible to wait for a few oscillations, for example 1 to 5, in order to ensure the system settles to a stable state. Only then is the period duration TR of an oscillation measured.

In order to avoid undesired noise, the change over to externally controlled operation should likewise be performed synchronously, that is to say with the same polarity of the control signal SS and SS' which is predefined by resonant operation at the changeover time. In other words, the power setting signal and the de-attenuation signal can be logically combined in a suitable manner in order to avoid voltage jumps at the edges of the time period TN on account of so-called glitches in the control signals SS and SS'.

As an alternative, the frequency converter can also be switched off for 1-3 oscillation periods and subsequently be restarted, as shown in FIG. 3. This makes synchronization superfluous and likewise avoids undesired noise caused by abrupt current changes in the induction heating coil.

In summary, the pot base temperature is determined by evaluating the temperature-dependent magnetic and electrical properties of the pot base material, which properties in turn influence oscillation parameters of the resonant circuit which comprises the induction heating coil 10.

The parameters or measured values are detected at the time of low power output by being obtained in the vicinity of the zero crossing of the AC mains voltage. Therefore, a defined operating point is set before detection.

The operating voltage of the frequency converter is kept constant during the measurement operation and the frequency converter is changed over to natural resonance operation for measurement purposes. It is then possible to wait until the resonance operation has stabilized or to measure whether the period duration is constant.

The changeover from controlled operation to natural resonance operation is performed with phase synchronization. In natural resonance operation, de-attenuation takes place by the current IL being fed back in the correct phase and the drive signal UA accordingly being generated in the correct phase.

As an alternative or in addition to measurement of the period duration TR, an amplitude of the current IL, a voltage across the induction heating coil 10, a phase angle between the said variables and/or any desired further currents and voltages of the resonant circuit can be measured, as long as these are dependent on the temperature of the pot base 24.

Figure 4:
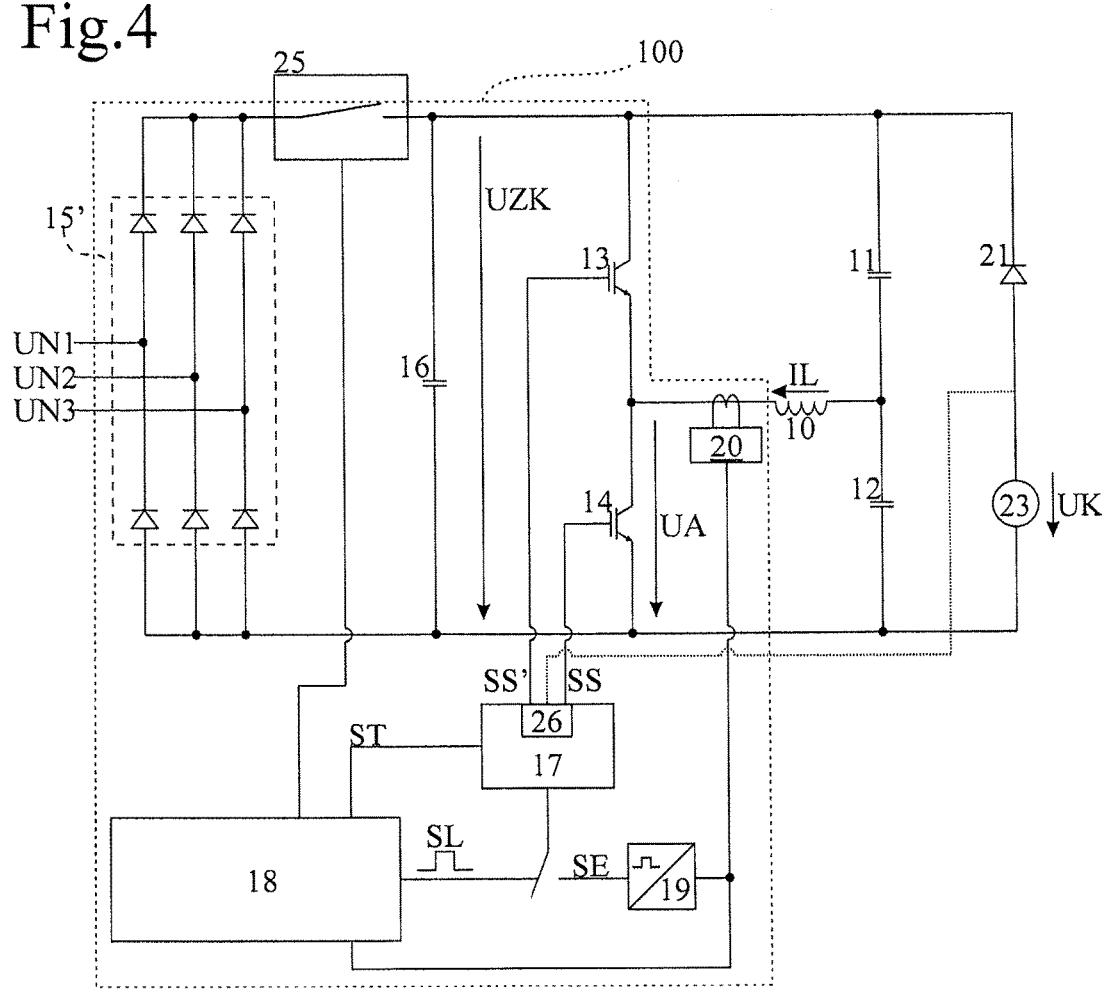

FIG. 4 shows a block diagram of a further embodiment of an induction heating device according to the invention which is supplied with power from a 3-phase AC mains system with phases UN1, UN2 and UN3. Identical reference symbols to those in FIG. 1 denote identical elements.

In the embodiment shown in FIG. 4, the supply voltage generated by a rectifier 15' is switched off periodically, for example every 1 to 10 seconds, for a short time, for example 500 μs. The measurement method described with reference to FIGS. 1 to 3 can be correspondingly applied during this time.

The switch-off operation can be performed, for example as shown, between the rectifier 15' and the intermediate circuit capacitor 16 by means of an IGBT 25. If the induction heating device has a power factor correction (PFC) unit, switches of the PFC unit can be used for reducing the voltage for measurement purposes. No additional switches are required in this case.

In the shown embodiments, the frequency converter comprises a half-bridge circuit having two IGB transistors. It goes without saying that the invention can also be employed in the context of converters with a full-bridge circuit having four IGB transistors or in the context of a single-transistor converter with only one IGB transistor.

The embodiments shown enable the pot base temperature to be determined reliably and without interference with a low level of outlay on circuitry.

The invention claimed is:

1. A method for determining a temperature of a cooking vessel base which is heated by means of an induction heating coil, comprising:
   generating an intermediate circuit voltage at least temporarily as a function of an AC mains voltage;
   generating a high-frequency drive voltage from the intermediate circuit voltage;
   applying the drive voltage to a resonant circuit comprising the induction heating coil, said resonant circuit having a natural resonant frequency;
   generating the intermediate circuit voltage over predefined time periods at a constant level;
   generating the drive voltage over the predefined time periods, wherein the generated drive voltage makes the resonant circuit oscillate at said natural resonant frequency in a de-attenuated manner;
   measuring at least one oscillation parameter comprising at least one detected resonant frequency of the resonant circuit over the predefined time periods;
   determining, via at least one processor, the temperature of said cooking vessel base based on the measured at least one detected resonant frequency of the resonant circuit during a duration comprising the predefined time periods; measuring a current profile through the induction heating coil or a voltage profile across the induction heating coil; and generating the drive voltage synchronously to the measured current profile or to the measured voltage profile, wherein the generated drive voltage makes the resonant circuit oscillate at said natural resonant frequency in a de-attenuated manner over the time periods.

2. The method according to claim 1, further comprising:
   determining zero crossings in the AC mains voltage; and selecting the time periods in the region of the zero crossings.

3. The method according to claim 2, wherein the time periods are centred with respect to the zero crossings.

4. The method according to claim 1, wherein the time periods have a duration in a range of 50 μs to 1000 μs.

5. The method according to claim 1, wherein the at least one oscillation parameter comprises one from the group of the natural resonant frequency, an amplitude of a resonant circuit voltage, an amplitude of a resonant circuit current, or a phase shift between the resonant circuit voltage and the resonant circuit current.

6. The method according to claim 1, wherein the intermediate circuit voltage is generated over the time periods at a level in a range of 10 V to 50 V.

7. The method according to claim 1, wherein a frequency of the drive voltage or a pulse duty factor of the drive voltage is varied for the purpose of setting a heating power, which is to be output by the induction heating coil, at times outside the time periods.

8. The method according to claim 1, further comprising:
generating the drive voltage by means of a half-bridge circuit comprising two IGB transistors, with the IGB transistors being driven by a control signal;
generating a power setting signal as a function of a heating power which is to be output;
generating a de-attenuation signal as a function of the measured current profile or the measured voltage profile; and
selecting the power setting signal as the control signal at times outside the time periods, and selecting the de-attenuation signal as the control signal at times within the time periods.

9. The method according to claim 8, wherein the control signal is generated at the edges of the time periods by logically combining the power setting signal and the de-attenuation signal.

10. An induction heating device comprising:
a frequency converter configured to generate a high-frequency drive voltage from an intermediate circuit voltage which is generated at least temporarily as a function of an AC mains voltage;
a resonant circuit having an induction heating coil, with the drive voltage applied to the resonant circuit;
a temperature detection device configured to determine a temperature of a cooking vessel base which is heated by means of the induction heating coil;
an auxiliary voltage source which is designed to generate the intermediate circuit voltage over predefined time periods at a constant level,
wherein the frequency converter is designed to generate the drive voltage over the time periods such that the resonant circuit oscillates at a natural resonant frequency in a de-attenuated manner, and
wherein the temperature detection device is designed to measure at least one oscillation parameter of the oscillation over the time periods, and to evaluate the at least one measured oscillation parameter in order to determine the temperature; and a current sensor configured to measure a current profile through the induction heating coil or a voltage profile across the induction heating coil, wherein the frequency converter is designed to generate the drive voltage in synchronism with the measured current profile or the measured voltage profile, wherein the generated drive voltage makes the resonant circuit oscillate at the said natural resonant frequency in a de-attenuated manner over the time periods.

11. An induction heating device according to claim 10, further comprising:
a zero crossing detector designed to determine zero crossings of the AC mains voltage; and
a control device designed to select the time periods in the region of the zero crossings.

12. The induction heating device according to claim 10, wherein the auxiliary voltage source is designed to generate an auxiliary voltage at a level in a range of 10 V to 50 V.

13. The induction heating device according to claim 10, further comprising:
a half-bridge circuit comprising two IGB transistors which are driven by a control signal, with the frequency converter being designed to generate a power setting signal as a function of a heating power which is to be output, and a de-attenuation signal as a function of the measured current profile or the measured voltage profile; and
a controller configured to select the power setting signal as the control signal at times outside the time periods, and to select the de-attenuation signal as the control signal at times over the time periods.

14. The induction heating device according to claim 13, further comprising:
a gate driver circuit driving the IGB transistors, with the auxiliary voltage source configured to supply a supply voltage to the gate driver circuit.

15. The method of claim 1, wherein:
determining further comprises determining the temperature of the cooking vessel base by evaluating a characteristic curve associating a cooking vessel base temperature with the resonant frequency.

* * * * *